(12) United States Patent  
Hahn

(10) Patent No.: US 6,287,388 B1
(45) Date of Patent: Sep. 11, 2001

(54) APPARATUS FOR REMOVING DUST PARTICLES FROM A VEHICLE BODY PRIOR TO SPRAYING THEREOF

(76) Inventor: Richard E. Hahn, 120 N. Crosby Ave. Suite 10, Janesville, WI (US) 53545

( * ) Notice: Subject to any disclaimer, the term of this patent is extended or adjusted under 35 U.S.C. 154(b) by 0 days.

(21) Appl. No.: 09/432,199

(22) Filed: Nov. 2, 1999

Related U.S. Application Data

(60) Provisional application No. 60/142,352, filed on Jun. 30, 1999.

(51) Int. Cl.[7] .................................. B08B 1/00; B60S 3/06
(52) U.S. Cl. ......................... 134/6; 15/97.3; 15/DIG. 2
(58) Field of Search .................................. 15/97.3, DIG. 2

(56) References Cited

U.S. PATENT DOCUMENTS

| 4,611,359 | * | 9/1986 | Bivens .................................. 15/97.3 |
| 4,689,749 | | 8/1987 | Glogonski . |
| 4,777,687 | | 10/1988 | Cann et al. . |
| 5,405,450 | | 4/1995 | Mifsud . |
| 5,524,329 | | 6/1996 | Schmalzel . |

* cited by examiner

Primary Examiner—Randall E. Chin
(74) Attorney, Agent, or Firm—David J. Archer

(57) ABSTRACT

An apparatus is disclosed for removing dust particles from top surfaces and first and second side surfaces of a vehicle body prior to spraying thereof.

15 Claims, 3 Drawing Sheets

APPARATUS FOR REMOVING DUST PARTICLES FROM A VEHICLE BODY PRIOR TO SPRAYING THEREOF

This application claim benefit to provisional application 60/142,352 filed Jun. 30, 1999.

BACKGROUND OF THE INVENTION

1. Field of the Invention

The present invention relates to an apparatus for removing dust particles from a vehicle body prior to spraying thereof. More specifically, the present invention relates to an apparatus for removing dust particles from top surfaces and first and second side surfaces a vehicle body prior to paint spraying thereof.

2. Information Disclosure Statement

To obtain quality paining of exterior surfaces of a vehicle body, dust, lint and other particulate contaminants must be removed from the body surfaces just prior to painting these surfaces. Previously, dust, lint and other particles have been removed by machines with various brushes and manually wiping with a tacky cloth the portions of the body missed by the brushes or by manually wiping the entire body with tacky cloths. These prior approaches are costly, not uniform and typically leave a significant amount of dust on the body.

More particularly, in the painting industry, it is necessary to tack off a vehicle body prior to painting of the vehicle body. Tacking off generally refers to the process of passing a vehicle body through an assembly, including a plurality of feather dusters. The feather dusters generally comprise a plurality of feathers, such as ostrich feathers, mounted on a rotatable hub. As the vehicle body passes through the assembly, the rotating feathers contact the vehicle body surface. The wiping action of the feathers against the vehicle body creates an electrostatic charge on the feathers. The charged feathers attract dust from the vehicle body. A shroud assembly is mounted over the feather dusters. Within the shroud assembly is an ionic discharge unit which continually discharges the dust from the feathers. A vacuum assembly within the shroud assembly removes the dust from within the shroud assembly. Problems arise when the vehicle bodies present nonplanar surfaces and depressions of varying widths. Specifically, vehicle bodies, such as flat-bed truck bodies, have planar surfaces on the hood and roof of the cab, but further include recessed portions of decreased width within the cargo-carrying area of the body. Complex and expensive machines have been devised which can tack off the hood and roof of the cab with one duster while using alternative means for tacking off the bed of the cargo-carrying area.

SUMMARY OF THE INVENTION

The present invention relates to an apparatus for removing dust particles from top surfaces and first and second side surfaces of a vehicle body prior to spraying thereof. The apparatus includes a frame, the frame having a first support member and a second support member which is disposed spaced and parallel relative to the first support member. The support members define therebetween an opening for the passage therethrough of the vehicle body. A first rail is rigidly secured to and extends angularly relative to the first support member. A second rail is rigidly secured to the second support member and is disposed parallel and spaced relative to the first rail. A first roller assembly extends between the rails, the first roller assembly including an axle having a first and a second end. The first end of the axle is slidably supported by the first rail and the second end of the axle is slidably supported by the second rail. A first roller is disposed coaxially relative to the axle for rotation about the axle. The arrangement is such that in use of the apparatus, when the vehicle body passes through the opening, the first roller accommodates the vehicle body so that the first and second ends of the axle slide relative to the first and second rails respectively. Also, a first tack cloth cover extends circumferentially around the first roller such that when the vehicle body passes through the opening, the first tack cloth cover contacts the top surface of the vehicle body for removing the dust particles therefrom.

A second roller assembly is disposed adjacent to the first side surface of the vehicle body. The second roller assembly includes a second roller and a second tack cloth cover which extends circumferentially around the second roller such that when the vehicle body passes through the opening, the second tack cloth cover contacts the first side surfaces of the vehicle body for removing the dust particles therefrom.

A third roller assembly is disposed adjacent to the second side surfaces of the vehicle body. The third roller assembly includes a third roller and a third tack cloth cover extends circumferentially around the third roller such that when the vehicle body passes through the opening, the third tack cloth cover contacts the second side surfaces of the vehicle body for removing the dust particles therefrom.

In a more specific embodiment of the present invention the first support member is disposed substantially vertically and a cross member extends between the support members, the arrangement being such that the cross member and the support members define therebetween the opening.

Moreover, the first rail is disposed angularly within a range 20 to 40 degrees relative to the first support member so that when the vehicle body passes through the opening, the first roller smoothly rides upon the top surface of the vehicle body and follows a contour of the vehicle body as the axle is slidably supported between the rails.

Also, the axle is disposed substantially horizontally so that movement of the first roller within the opening is permitted.

Furthermore, the axle is of rectangular cross sectional configuration and the first roller includes a plurality of disc shaped segments, each of the segments defining a hole for receiving therethrough the axle.

Additionally, each of the segments further includes a collar which extends coaxially through the segment and which is rigidly secured thereto, the collar cooperating with the axle such that when the axle is controllably rotated, the segments of the first roller are rotated. The arrangement is such that as the vehicle body progresses through the opening, the first tack cloth cover which surrounds the first roller is rotated so that as dust particles are removed by the first tack cloth cover, the first tack cloth cover is progressively renewed.

Also, the second roller assembly further includes a support arm which includes a first and a second rod, the first rod having a proximal and a distal end. The second rod also has a proximal and a distal end. The proximal ends of the rods are spaced relative to each other, the first rod rotating about a vertical axis. The distal ends of the rods are rotatably secured to the second roller, the rods being disposed parallel relative to each other such that regardless of movement of the second roller relative to the vehicle body, the second roller rotates about an axis disposed parallel to the vertical axis.

Additionally, the third roller assembly further includes a support beam which includes a first and a second arm, the first arm having a proximal and a distal end. The second arm also has a proximal and a distal end, the proximal ends of the arms being spaced relative to each other. The first arm rotates about a vertical axis, the distal ends of the arms being rotatably secured to the third roller. The arms are disposed relative to each other such that regardless of movement of the third roller relative to the vehicle body, the third roller rotates about an axis which is disposed parallel to the vertical axis.

Moreover, the second and third roller assemblies are disposed downstream relative to the first roller assembly.

Also, drive means are provided for rotatably driving each of the roller assemblies and control means are connected to the drive means for controlling rotation of each of the roller assemblies.

The present invention also includes a method for removing dust particles from top surfaces and first and second side surfaces of a vehicle body prior to spraying thereof. The method includes the steps of passing the vehicle body through an opening defined by support members.

The method also includes the step of guiding a first roller assembly supported by a first and second rail rigidly secured angularly relative to the support members so that when the vehicle body passes through the opening, a first roller of the first roller assembly accommodates the vehicle body such that a first tack cloth cover wrapping the first roller contacts the top surfaces of the vehicle body for removing dust particles therefrom.

Additionally, the method includes the step of contacting the first and second surfaces respectively of the vehicle body with a second tack cloth cover wrapping a second roller and a third tack cloth cover wrapping a third roller so that as the vehicle body passes through the opening, the first, second and third tack cloth cover contacts the top, first and second side surfaces of the vehicle body for removing the dust particles therefrom.

Many modifications and variations of the present invention will be readily apparent to those skilled in the art by a careful consideration of the detailed description of a preferred embodiment of the present invention contained herein and as shown in the annexed drawings. However, such modifications and variations fall within the spirit and scope of the present invention as defined by the appended claims.

BRIEF DESCRIPTION OF THE DRAWINGS

Similar reference characters refer to similar parts therethrough the various views of the drawings.

DETAILED DESCRIPTION OF THE DRAWINGS

Figure 1:
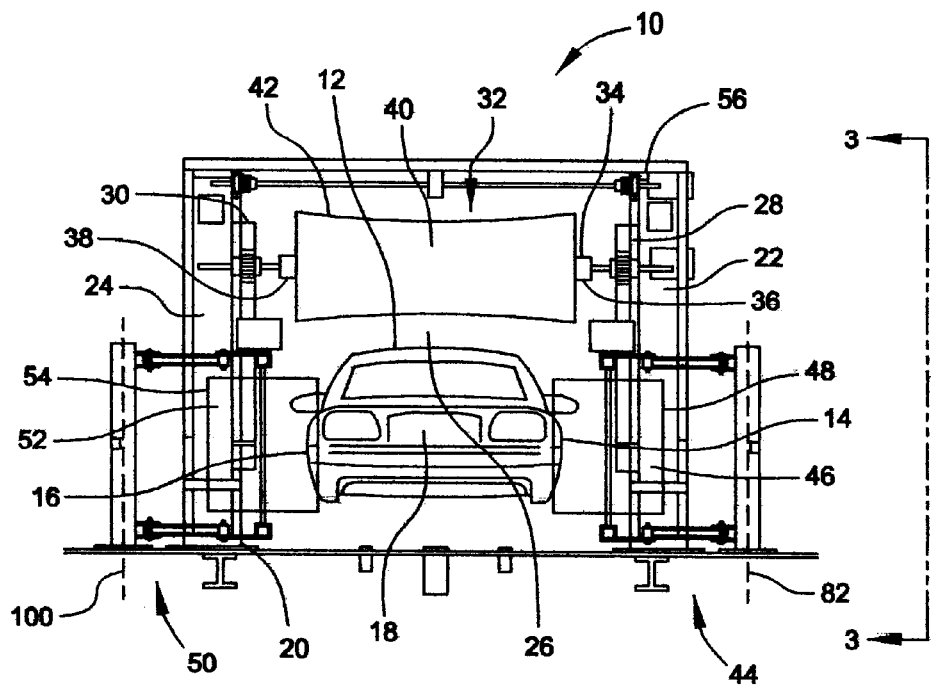
FIG. 1 is a front elevational view of an apparatus according to the present invention.

FIG. 1 is a front elevational view of an apparatus generally designated 10 according to the present invention for removing dust particles from top surfaces 12 and first and second side surfaces 14 and 16 respectively of a vehicle body 18 prior to spraying thereof.

The apparatus 10 includes a frame 20, the frame 20 having a first support member 22 and a second support member 24 which is disposed spaced and parallel relative to the first support member 22. The support members 22 and 24 define therebetween an opening 26 for the passage therethrough of the vehicle body 18. A first rail 28 is rigidly secured to and extends angularly relative to the first support member 22. A second rail 30 is rigidly secured to the second support member 24 and is disposed parallel and spaced relative to the first rail 28. A first roller assembly generally designated 32 extends between the rails 28 and 30, the first roller assembly 32 including an axle 34 having a first and a second end 36 and 38 respectively. The first end 36 of the axle 34 is slidably supported by the first rail 28 and the second end 38 of the axle 34 is slidably supported by the second rail 30. A first roller 40 is disposed coaxially relative to the axle 34 for rotation about the axle 34. The arrangement is such that in use of the apparatus 10, when the vehicle body 18 passes through the opening 26, the first roller 40 accommodates the vehicle body 18 so that the first and second ends 36 and 38 respectively of the axle 34 slide relative to the first and second rails 28 and 30 respectively. Also, a first tack cloth cover 42 extends circumferentially around the first roller 40 such that when the vehicle body 18 passes through the opening 26, the first tack cloth cover 42 contacts the top surfaces 12 of the vehicle body 18 for removing the dust particles therefrom.

A second roller assembly generally designated 44 is disposed adjacent to the first side surfaces 14 of the vehicle body 18. The second roller assembly 44 includes a second roller 46 and a second tack cloth cover 48 which extends circumferentially around the second roller 46 such that when the vehicle body 18 passes through the opening 26, the second tack cloth cover 48 contacts the first side surfaces 14 of the vehicle body 18 for removing the dust particles therefrom.

A third roller assembly generally designated 50 is disposed adjacent to the second side surfaces 16 of the vehicle body 18. The third roller assembly 50 includes a third roller 52 and a third tack cloth cover 54 extends circumferentially around the third roller 52 such that when the vehicle body 18 passes through the opening 26, the third tack cloth cover 54 contacts the second side surfaces 16 of the vehicle body 18 for removing the dust particles therefrom.

Figure 2:
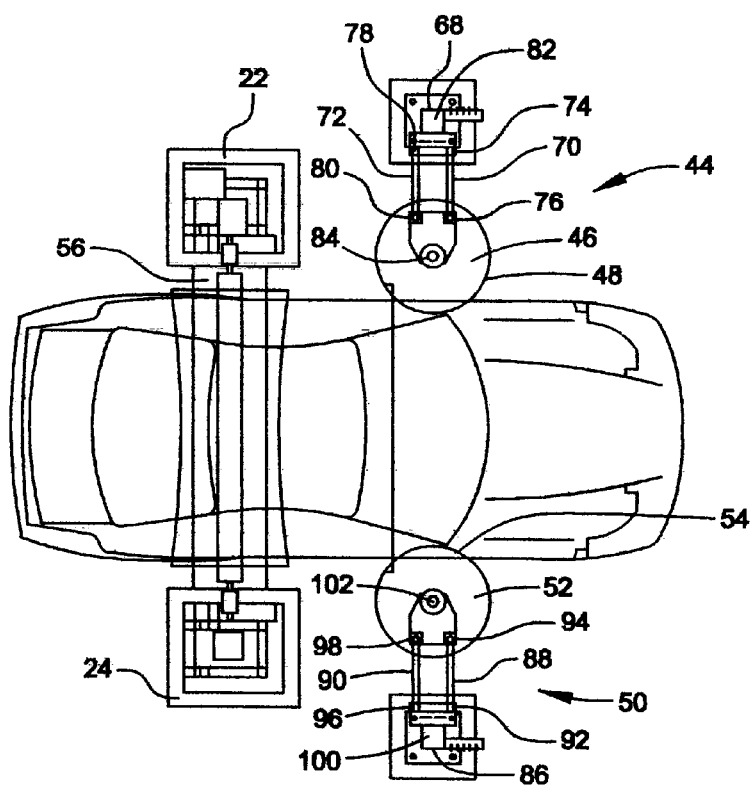
FIG. 2 is a top plan view of the apparatus shown in FIG. 1.

FIG. 2 is a top plan view of the apparatus shown in FIG. 1. As shown in FIG. 2, the first support member 22 is disposed substantially vertically and a cross member 56 extends between the support members 22 and 24 respectively. The arrangement is such that the cross member 56 and the support members 22 and 24 define therebetween the opening 26.

Figure 3:
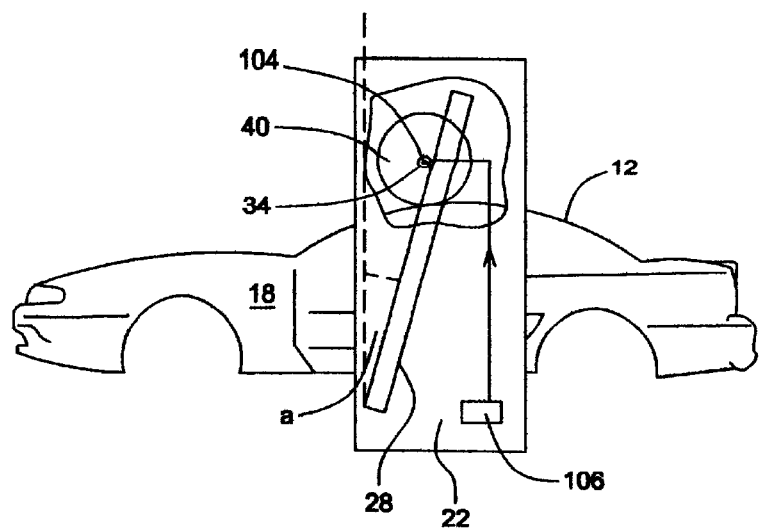
FIG. 3 is a view taken on the line 3—3 of FIG. 1.

FIG. 3 is a view taken on the line 3—3 of FIG. 1. As shown in FIGS. 1 and 3, the first rail 28 is disposed angularly relative to the first support member 22 at an angle "a" within a range of 20 to 40 degrees so that when the vehicle body 18 passes through the opening 26, the first roller 40 smoothly rides upon the top surface 12 of the vehicle body 18 and follows a contour of the vehicle body 18 as the axle 34 is slidably supported therebetween the rails 28 and 30 respectively.

As shown in FIGS. 1 and 3, the axle 34 is disposed substantially horizontally so that movement of the first roller 40 within the opening 26 is permitted.

Figure 4:
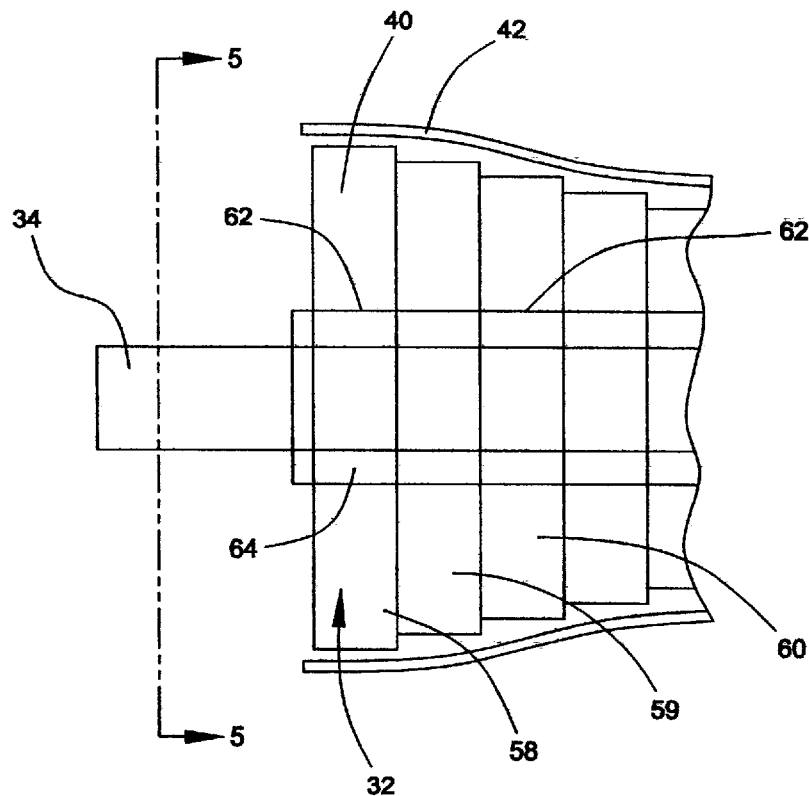
FIG. 4 is an enlarged sectional view of one end of the first roller assembly shown in FIG. 1.

FIG. 4 is an enlarged view of one end of the first roller assembly 32. As shown in FIG. 4, the axle 34 is of rectangular cross sectional configuration and the first roller 40 includes a plurality of disc shaped segments 58, 59 and 60, each of the segments 58–60 defining a hole 62 for receiving therethrough the axle 34.

Figure 5:
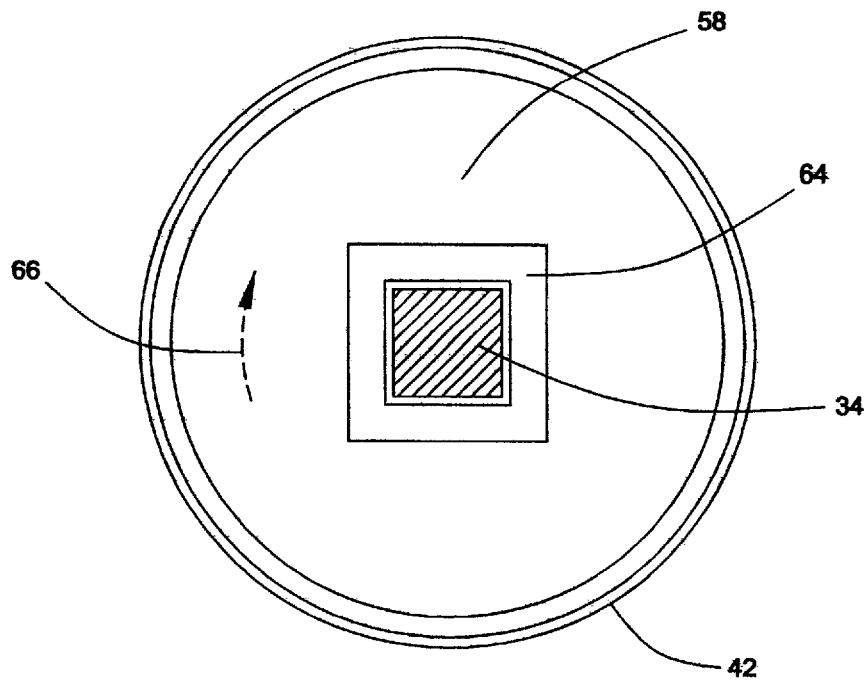
FIG. 5 is a sectional view taken on the line 5—5 of FIG. 4.

FIG. 5 is a sectional view taken on the line 5—5 of FIG. 4. As shown in FIG. 5, each of the segments 58–60 further includes a collar 64 which extends coaxially through a respective segment such as 58 and is rigidly secured thereto. The collar 64 cooperates with the axle 34 such that when the axle 34 is controllably rotated as indicated by the arrow 66, the segments 58–60 of the first roller 40 are rotated. The arrangement is such that as the vehicle body 18 progresses through the opening 26, the first tack cloth cover 42 which surrounds the first roller 40 is rotated so that as dust particles are removed by the first cloth cover 42, the first tack cloth cover 42 is progressively renewed.

Figure 6:
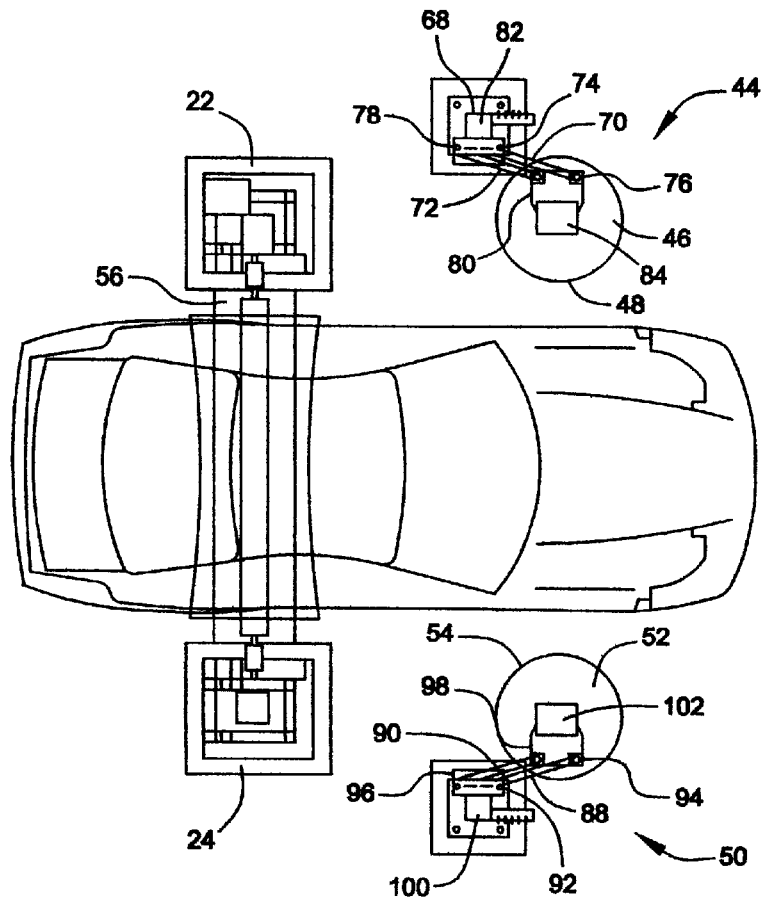
FIG. 6 is a similar view to that shown in FIG. 2 but with the second and third roller retracted.

FIG. 6 is a similar view to that shown in FIG. 2 but shows the second and third roller assemblies 44 and 50 retracted. As shown in FIGS. 2 and 6, the second roller assembly 44 further includes a support arm 68 which includes a first and a second rod 70 and 72 respectively. The first rod 70 has a proximal and a distal end 74 and 76 respectively and the second rod 72 has a proximal and a distal end 78 and 80 respectively. The proximal ends 74 and 78 respectively of the rods 70 and 72 respectively are spaced relative to each other, the first rod 70 rotating about a vertical axis 82. The distal ends 76 and 80 respectively of the rods 70 and 72 respectively are rotatably secured to the second roller 46, the rods 70 and 72 being disposed parallel relative to each other such that regardless of movement of the second roller 46 relative to the vehicle body 18, the second roller 46 rotates about a further axis 84 disposed parallel to the vertical axis 82.

As shown in FIGS. 2 and 6, the third roller assembly generally designated 50 further includes a support beam 86 which includes a first a second arm 88 and 90, the first arm 88 having a proximal and a distal end 92 and 94 respectively. Also, the second arm 90 has a proximal and a distal end 96 and 98 respectively, the proximal ends 92 and 96 of the arms 88 and 90 being spaced relative to each other. The first arm 88 rotates about a vertical axis 100 as shown in FIG. 1. The distal ends 94 and 98 of the arms 88 and 90 are rotatably secured to the third roller 52. The arms 88 and 90 are disposed parallel relative to each other such that regardless of movement of the third roller 52 relative to the vehicle body 18, the third roller 52 rotates about a further axis 102 disposed parallel to the vertical axis 100.

Moreover, the second and third roller assemblies 44 and 50 respectively are disposed downstream relative to the first roller assembly 32.

Also, as shown in FIG. 3, drive means 104 such as an electric motor are provided for rotatably driving each of the roller assemblies 32, 44 and 50 and control means 106 are connected to the drive means 104 for controlling the rotation of each of the roller assemblies 32, 44 and 50.

In operation of the apparatus according to the present invention, a first roller assembly supported by a first and second rail rigidly secured angularly relative to the support members is guided so that when the vehicle body passes through the opening. A first roller of the first roller assembly accommodates the vehicle body such that a first tack cloth cover wrapping the first roller contacts the top surfaces of the vehicle body for removing dust particles therefrom.

Additionally, the operation includes the step of contacting the first and second surfaces respectively of the vehicle body with a second tack cloth cover wrapping a second roller and a third tack cloth cover wrapping a third roller so that as the vehicle body passes through the opening, the first, second and third tack cloth covers contact the top, first and second side surfaces of the vehicle body for removing the dust particles therefrom.

The arrangement is such that each of the rollers 40, 46 and 52 are manually wrapped with respective tack cloth covers 42, 48 and 54 after one revolution of the rollers is completed. Typically, the rollers 40, 46 and 52 are revolved very slowly so that approximately 500 vehicle bodies can be tacked off and then the covers 42, 48 and 54 are removed and replaced with new tack cloth covers.

The present invention provides a unique means for removing particles from a vehicle body prior to spraying thereof.

What is claimed is:

1. An apparatus for removing dust particles from top surfaces and first and second side surfaces of a vehicle body prior to spraying thereof, said apparatus comprising:

a frame, said frame including:
   a first support member;
   a second support member disposed spaced and parallel relative to said first support member, said support members defining therebetween an opening for the passage therethrough of the vehicle body;
   a first rail rigidly secured to and extending angularly relative to said first support member;
   a second rail rigidly secured to said second support member and disposed parallel and spaced relative to said first rail;
a first roller assembly extending between said rails, said first roller assembly including:
   an axle having a first and a second end, said first end of said axle being slidably supported by said first rail, said second end of said axle being slidably supported by said second rail;
   a first roller disposed coaxially relative to said axle for rotation about said axle, the arrangement being such that in use of the apparatus, when the vehicle body passes through said opening, said first roller accommodates the vehicle body so that said first and second ends of said axle slide relative to said first and second rails respectively;
   a first tack cloth cover extending circumferentially around said first roller such that when the vehicle body passes through said opening, said first tack cloth cover contacts the top surfaces of the vehicle body for removing the dust particles therefrom;
a second roller assembly disposed adjacent to the first side surfaces of the vehicle body;
said second roller assembly including:
   a second roller;
   a second tack cloth cover extending circumferentially around said second roller such that when the vehicle body passes through said opening, said second tack cloth cover contacts the first side surfaces of the vehicle body for removing the dust particles therefrom;
a third roller assembly disposed adjacent to the second side surfaces of the vehicle body;
said third roller assembly including:
   a third roller; and
   a third tack cloth cover extending circumferentially around said third roller such that when the vehicle body passes through said opening, said third tack cloth cover contacts the second side surfaces of the vehicle body for removing the dust particles therefrom.

2. An apparatus for removing dust particles as set forth in claim 1 wherein
said first support member is disposed substantially vertically.
3. An apparatus for removing dust particles as set forth in claim 1 further including:
a cross member extending between said support members the arrangement being such that said cross member and said support members define therebetween said opening.
4. An apparatus for removing dust particles as set forth in claim 1 wherein
said first rail is disposed angularly within a range 20 to 40 degrees relative to said first support member so that when the vehicle body passes through said opening, said first roller smoothly rides upon the top surfaces of the vehicle body and follows a contour of the vehicle body as said axle is slidably supported between said rails.
5. An apparatus for removing dust particles as set forth in claim 1 wherein
said axle is disposed substantially horizontally so that movement of said first roller within said opening is permitted.
6. An apparatus for removing dust particles as set forth in claim 1 wherein
said axle is of rectangular cross sectional configuration.
7. An apparatus for removing dust particles as set forth in claim 6 wherein
said first roller includes:
a plurality of disc shaped segments, each of said segments defining a hole for receiving therethrough said axle.
8. An apparatus for removing dust particles as set forth in claim 7 wherein
each of said segment further includes:
a collar extending coaxially through said segment and rigidly secured thereto, said collar cooperating with said axle such that when said axis is controllably rotated, said segments of said first roller are rotated, the arrangement being such that as the vehicle body progresses through said opening, said first tack cloth which surrounds said first roller is rotated so that as dust particles are removed by said first tack cloth cover, said first tack cover is progressively renewed.
9. An apparatus for removing dust particles as set forth in claim 1 wherein
said second roller assembly further includes:
a support arm including:
a first and a second rod, said first rod having a proximal and a distal end, said second rod having a proximal and a distal end, said proximal ends of said rods being spaced relative to each other, said first rod rotating about a vertical axis, said distal ends of said rods being rotatably secured to said second roller, said rods being disposed parallel relative to each other such that regardless of movement of said second roller relative to the vehicle body, said second roller rotates about an axis disposed parallel to said vertical axis.
10. An apparatus for removing dust particles as set forth in claim 1 wherein
said third roller assembly further includes:
a support beam which includes:
a first and a second end, said first arm having a proximal end and a distal end, said second arm having a proximal and a distal end, said proximal ends of said arms being spaced relative to each other, said first arm rotating about a vertical axis, said distal ends of said arms being rotatably secured to said third roller, said arms being disposed parallel relative to each other such that regardless of movement of said third roller relative to the vehicle body, said third roller rotates about an axis disposed parallel to said vertical axis.
11. An apparatus for removing dust particles as set forth in claim 1 wherein
said second and third roller assemblies are disposed downstream relative to said first roller assembly.
12. An apparatus for removing dust particles as set forth in claim 1 further including:
drive means for rotatably driving each of said roller assemblies;
control means connected to said drive means for controlling rotation of each of said roller assemblies.
13. An apparatus for removing dust particles from top surfaces and first and second side surfaces of a vehicle body prior to spraying thereof, said apparatus comprising:
a frame, said frame including:
a first support member;
a second support member disposed spaced and parallel relative to said first support member, said support members defining therebetween an opening for the passage therethrough of the vehicle body;
a first rail rigidly secured to and extending angularly relative to said first support member;
a second rail rigidly secured to said second support member and disposed parallel and spaced relative to said first rail;
a first roller assembly extending between said rails, said first roller assembly including:
an axle having a first and a second end, said first end of said axle being slidably supported by said first rail, said second end of said axle being slidably supported by said second rail;
a first roller disposed coaxially relative to said axle for rotation about said axle, the arrangement being such that in use of the apparatus, when the vehicle body passes through said opening, said first roller accommodates the vehicle body so that said first and second ends of said axle slide relative to said first and second rails respectively;
a first tack cloth cover extending circumferentially around said first roller such that when the vehicle body passes through said opening, said first tack cloth cover contacts the top surfaces of the vehicle body for removing the dust particles therefrom;
a second roller assembly disposed adjacent to the first side surfaces of the vehicle body;
said second roller assembly including:
a second roller;
a second tack cloth cover extending circumferentially around said second roller such that when the vehicle body passes through said opening, said second tack cloth cover contacts the first side surfaces of the vehicle body for removing the dust particles therefrom;
a third roller assembly disposed adjacent to the second side surfaces of the vehicle body;
said third roller assembly including:
a third roller; and
a third tack cloth cover extending circumferentially around said third roller such that when the vehicle body passes through said opening, said third tack cloth cover contacts the second side surfaces of the vehicle body for removing the dust particles therefrom; and said first rail being disposed angularly within a range 25 to 35 degrees relative to said first support member so that when the vehicle body passes through said opening, said first roller smoothly rides upon the top surface of the vehicle body and follows a contour of the vehicle body as said axle is slidably supported between said rails.

14. An apparatus for removing dust particles from top surfaces of a vehicle body prior to spraying thereof, said apparatus comprising:

a frame, said frame including:
 a first support member;
 a second support member disposed spaced and parallel relative to said first support member, said support members defining therebetween an opening for the passage therethrough of the vehicle body;
 a first rail rigidly secured to and extending angularly relative to said first support member;
 a second rail rigidly secured to said second support member and disposed parallel and spaced relative to said first rail;
 a roller assembly extending between said rails, said first roller assembly including:
  an axle having a first and a second end, said first end of said axle being slidably supported by said first rail, said second end of said axle being slidably supported by said second rail;
  a roller disposed coaxially relative to said axle for rotation about said axle, the arrangement being such that in use of the apparatus, when the vehicle body passes through said opening, said roller accommodates the vehicle body so that said first and second ends of said axle slide relative to said first and second rails respectively; and
 a first tack cloth cover extending circumferentially around said roller such that when the vehicle body passes through said opening, said tack cloth cover contacts the top surfaces of the vehicle body for removing the dust particles therefrom.

15. A method for removing dust particles from top surfaces and first and second side surfaces of a vehicle body prior to spraying thereof, the method comprising the steps of:

passing the vehicle body through an opening defined by support members;

guiding a first roller assembly supported by a first and second rail rigidly secured angularly relative to the support members so that when the vehicle body passes through the opening, a first roller of the first roller assembly accommodates the vehicle body such that a first tack cloth cover wrapping the first roller contacts the top surfaces of the vehicle body for removing dust particles therefrom; and contacting the first and second surfaces respectively of the vehicle body with a second tack cloth cover wrapping a second roller and a third tack cloth cover wrapping a third roller so that as the vehicle body passes through the opening, the first, second and third tack cloth covers contact the top, first and second side surfaces of the vehicle body for removing the dust particles therefrom.

* * * * *